United States Patent [19]

Fleischer

[11] 4,129,776

[45] Dec. 12, 1978

[54] DETECTION OF SUBSURFACE AIR FLOW

[75] Inventor: Robert L. Fleischer, Schenectady, N.Y.

[73] Assignee: General Electric Company, Schenectady, N.Y.

[21] Appl. No.: 808,963

[22] Filed: Jun. 22, 1977

[51] Int. Cl.$^2$ .............................................. G01V 5/00
[52] U.S. Cl. ................................................... 250/253
[58] Field of Search ................ 250/253, 254, 472, 473

[56] References Cited

U.S. PATENT DOCUMENTS

| | | | |
|---|---|---|---|
| 3,665,194 | 5/1972 | Alter et al. | 250/253 |
| 4,017,731 | 4/1977 | Howell et al. | 250/253 |
| 4,064,436 | 12/1977 | Ward | 250/253 |

Primary Examiner—Davis L. Willis
Attorney, Agent, or Firm—Leo I. MaLossi; Joseph T. Cohen; Charles T. Watts

[57] ABSTRACT

A method and apparatus are described for determining the occurrence or non-occurrence of subsurface air flow and, in the event of the occurrence of subsurface air flow, being able to determine its direction into or out of the earth. The determinations are accomplished by the use of a pair of alpha particle detectors, each of which is disposed in a protective enclosure to constitute a detector unit. A pair of such units is employed, the two units being buried in the earth spaced from each other and at different depths. Readings detecting alpha particle emission are taken on both units and compared.

7 Claims, 3 Drawing Figures

DETECTION OF SUBSURFACE AIR FLOW

BACKGROUND OF THE INVENTION

One method and apparatus by which the presence and concentration of radon and its alpha-emitting daughters can be effectively detected and monitored is disclosed in U.S. Pat. No. 3,665,194 — Alter et al., incorporated by reference. A sheet of solid state track-registration material (the alpha particle detector) is disposed in a protective environment at a location to be checked for the emission of radon. If the track-registration material becomes irradiated by alpha particles, minute damage "tracks" are created therein, which tracks can be enlarged and made visible by contact with a reagent to which the tracks display preferential chechmical reactivity.

Apparatus is described in U.S. Patent Application Ser. No. 715,224 — Ward filed (now U.S. Pat. No. 4,064,436) Aug. 18, 1976 (assigned to the assignee of the instant invention at the time of the filing thereof) for the reduction or removal of background noise caused by thoron gas ($^{220}$Rn) in uranium exploration which exploration is being conducted by the detection of radon gas ($^{222}$Rn) emanating from the ground. The objective is achieved by disposing in the path of the gases passing to the alpha particle detector a permselective membrane, which permits, but selectively retards, the passage therethrough of thoron and radon. The Ward patent is incorporated by reference.

Ordinarily this uranium exploration is carried out by burying in the earth inverted cup-shaped housings containing the track-registration material. The housings are set forth in a predetermined arrangement (e.g., a grid system) and permitted to remain for a preselected period of time (e.g., four weeks). Thereafter the housings and detectors are removed, the detectors are subjected to a chemical etching solution and the number of tracks etched on each detector is counted by micro-scopic inspection. Correlation of the results from the various housings are made in order to determine whether subsurface uranium ore is present and where.

Another method of uranium exploration substitutes an electronic solid state detector of alpha particles for the track registration material of the method described hereinabove. These electronic detectors may be used repetitively either in the same or new locations.

SUMMARY OF THE INVENTION

A method and apparatus are described for determining the occurrence or non-occurrence of subsurface air flow and, in the event of the occurrrence of subsurface air flow, being able to determine its direction into or out of the earth. The determinations are accomplished by the use of a pair of alpha particle detectors, each of which is disposed in a protective enclosure to constitute a detector unit. A pair of such units is employed, the two units being buried in the earth spaced from each other and at different depths. Readings detecting alpha particle emission are taken on both units and compared.

BRIEF DESCRIPTION OF THE DRAWING

The subject matter of the instant invention for which protection is sought is presented as claims at the conclusion of the written description of the invention set forth herein. The description sets forth the manner and process of making and using the invention and the accompanying drawing forms part of the description for schematically illustrating the invention and the best mode. The view shown in FIG. 1 schematically illustrates the disposition of the detector units and the generation of information therefrom indicating no significant subsurface air flow, and FIGS. 2 and 3 schematically show the same arrangement together with indications of the information generated in the event of upwardly moving subsurface air flow and downwardly moving subsurface air flow, respectively.

MANNER AND PROCESS OF MAKING AND USING THE INVENTION

In searching for subsurface, distant deposits of uranium, other mineral or organic resources, it would be helpful to identify where flow from depth is emanating at the earth's surface. The method of this invention is particularly applicable to uranium prospecting and employs the radon signal from subsurface uranium for deciding where such upward flow is present. The fact that uranium ore has been discovered at depths of $\sim$ 100 m as a result of excess radon appearing at the surface implies that flow from distant, subsurface deposits does occur under some conditions.

Under conditions of zero net vertical flow of soil gas, the radon concentration with a few diffusion distances of the surface is lowered by the diffusion of radon to the surface whereupon it escapes. A pair of track-etch detectors at different depths, at least one of which is within the near-surface layer, where the concentration is lowered significantly, is used to reveal that fact. If, however, the radon gas is flowing upward, the gradient will be increased and will be perceptible only very close to the earth's surface.

To facilitate the description of this invention reference will be made to the application thereof in the method disclosed in the aforementioned U.S. Pat. No. 3,665,194 in which a solid state track-detector is used as the alpha particle detector. This invention is equally applicable when other forms of alpha particle detector are employed.

Figure 1:
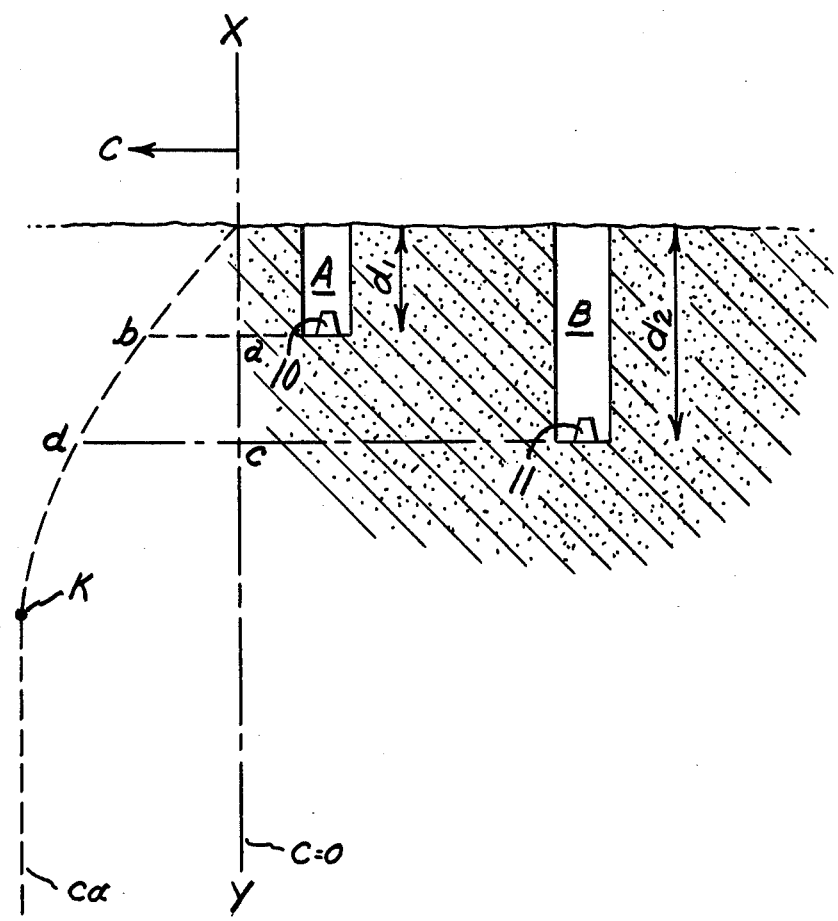
Figure 2:
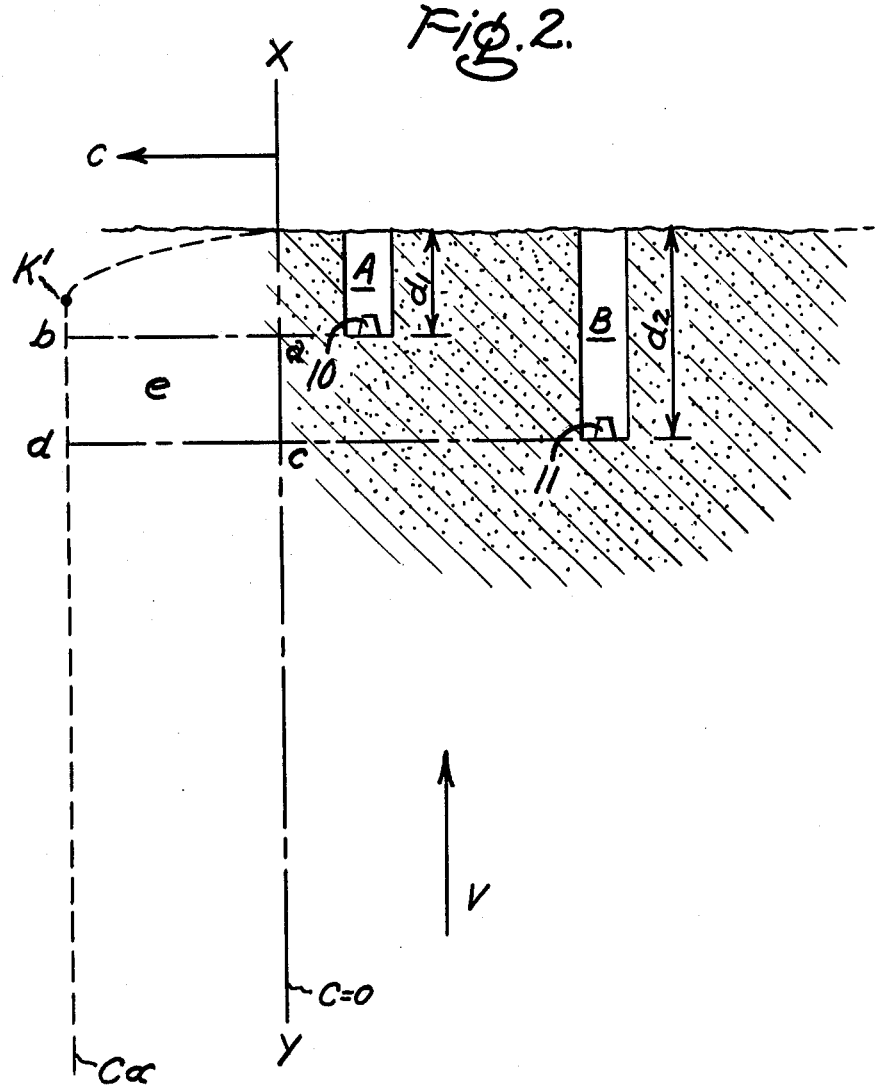
Figure 3:
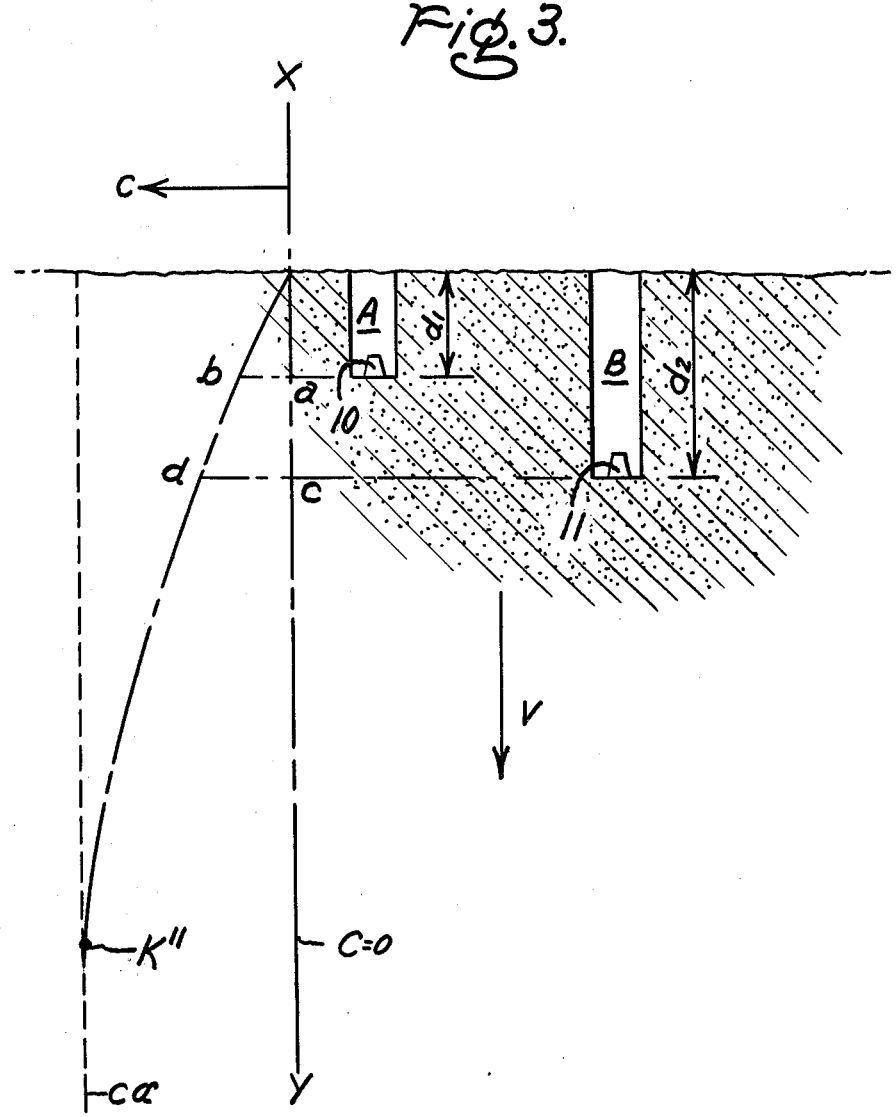

The general procedure and apparatus for each of FIGS. 1, 2 and 3 is identical, the three cases being set forth in order to illustrate different results that may be encountered depending upon whether subsurface air flow is present and, if so, the direction thereof. Thus, when a site has been chosen at which the method is to be practiced, holes A and B are dug in the soil to accommodate placement of identical cup-shaped housings 10,11 containing the track-registration material, one such housing being disposed in each hole in the inverted position. It is preferred that cups 10 and 11 be equipped with a permselective membrane according to the teachings in the Ward application. However, providing that a separate determination is made to determine the amount of thoron signal encountered in that region, cups 10 and 11 may be used without the permselective membrane, but it is then necessary to subtract from the total alpha particle signal, the portion for which thorium emanations are responsible.

A method for determining the thorium background signal is described on pages 37–39 of the Technical Information Series publication, "of Integrated Radon Emanation For Detection of Long Distance Migration of Gases Within the Earth: Techniques and Principles" by R. L. Fleischer and A. Mogro-Campero [Report No. 77CRD067, April 1977 — Technical Information Exchange, P.O. Box 43, Bldg. 5, Schenectady, New York 12301].

The depths of holes A and B have been indicated as $d_1$ and $d_2$, respectively. The value of $d_1$ may range between about 20 cm and 60 cm. The value of $d_2$ should be greater than about 1.5 $d_1$. Spacing between holes A and B should be at least as great as the value of $d_2$ but should not exceed twice the value of $d_2$. Otherwise, no special treatment is required, although typically a board will be placed over the hole with this in turn being covered with dirt from the excavation.

The alpha particle track-detector material, e.g., a piece of cellulose nitrate (not shown), is mounted within each cup 10,11. This track-detector material will measure the emanation from the ground below of the gaseous radon isotopes $^{220}Rn$ (unless provision is made to exclude the $^{220}Rn$ signal) and $^{222}Rn$. The $^{222}Rn$ gas is a decayed product of uranium and, therefore, the detection of such emanations would be an indication of the presence of uranium in the earth below. The other alpha particle emitting gas, $^{220}Rn$, is a decayed product of thorium and, hence, tracks induced thereby in the track-detector material constitute an unwanted background signal, when uranium is being sought. Usually, the cups are permitted to remain in position for about one month before being removed for a determination of the minute damage "tracks" created in the track registration material. When the extent of track etching has been determined for both cups, this will provide a reading at each of the depths $d_1$ and $d_2$ of the concentration of radon at these depths. In each of FIGS. 1, 2, and 3 the concentration is plotted to the left of vertical line XY, representing a concentration of 0 with increasing concentration being represented by points further away from line XY.

The values plotted schematically for the concentration of $^{222}Rn$ as a function of depth under different velocity conditions can be obtained mathematically by utilizing the following formula:

$$c = c\infty \, [1 - e^{-z/L}] \qquad (1)$$

wherein L is obtained from the following expression:

$$L^{-1} = [(v/2D)^2 + (\lambda/D)]^{1/2} - v/2D \qquad (2)$$

where
z is the depth below the surface
$\lambda$ is the decay constant of $^{222}Rn$ ($2.10 \times 10^{-6}$/sec)
$c\infty$ is the concentration of $^{222}Rn$ in the medium (i.e., the soil) if no net radon is escaping
v is the velocity of $^{222}Rn$ movement through the medium with the $^{222}Rn$ being constantly produced, and
D is the $^{222}Rn$ diffusion constant.

One way to determine D for a given soil is described in the aforementioned Technical Information Series publication on pages 39,40. Also, a table of values for D (reproduced below) and references to publications describing other ways to determine D are found in the article "Radon Migration in the Ground: A Review" — A. B. Tanner [The Natural Radiation Environment, Adams & Lowder, Eds., U. of Chicago Press, Chicago, 1964, p. 161].

TABLE 1
SUMMARY OF DIFFUSION COEFFICIENTS (D) REPORTED FOR RADON ISOTOPES IN VARIOUS MEDIA

| Diffusing Isotope | Fluid | Medium | D(cm²/sec) | Conditions | Authority |
|---|---|---|---|---|---|
| Rn, Tn, An | Air | Continuous | $1.0 \times 10^{-1}$ | Various | Various, quoted in Zimens, 1943 |
| Rn | " | " | $1.20 \times 10^{-1}$ | 15° C., 76 cm. Hg | Hirst and Harrison, 1939 |
| " | $H_2$ | " | $4.76 \times 10^{-1}$ | " | " |
| " | He | " | $3.51 \times 10^{-1}$ | " | " |
| " | Ne | " | $2.17 \times 10^{-1}$ | " | " |
| " | Ar | " | $9.2 \times 10^{-2}$ | " | " |
| " | Alcohol | " | $2.69 \times 10^{-5}$ | 18° C. | Rona, 1917, and Ramstedt, 1919, quoted in Zimens, 1943 |
| " | Toluene | " | $2.67 \times 10^{-5}$ | " | " |
| " | Benzene | " | $2.36 \times 10^{-5}$ | " | " |
| " | Water | " | $1.13 \times 10^{-5}$ | " | " |
| " | Air, 4% moisture | Building sand 1.40 gm/cm³, 39% porosity | $5.4 \times 10^{-2}$ | Not stated | Bulashevich and Khayritdinov, 1959 |
| Tn | Air, no moisture | Fine sand (mostly quartz) | $6.8 \times 10^{-2}$ | Not stated | Grammakov, 1936 |
| " | Air, 8.1% moisture | " | $5.0 \times 10^{-2}$ | " | " |
| " | Air, 15.2% moisture | " | $1.0 \times 10^{-2}$ | " | " |
| " | Air, 17% moisture | " | $5.0 \times 10^{-3}$ | " | " |
| Rn | Air | Eluvial-detrital deposits of granodiorite | $4.5 \times 10^{-2}$ | Mean effective value in natural occurrence | Popretinskiy, 1961 |
| " | " | Diluvium of metamorphic rocks | $1.8 \times 10^{-2}$ | " | " |
| " | " | Eluvial-detrital deposits of granite | $1.5 \times 10^{-2}$ | " | " |
| " | " | Loams | $8.0 \times 10^{-3}$ | " | " |
| " | " | Varved clays | $7.0 \times 10^{-3}$ | " | " |
| " | Air, 37.2% moisture | Mud, 1.57 gm/cm³ | $5.7 \times 10^{-6}$ | 19°-20° C. | Baranov and Novitskaya, 1949 |
| " | Air, 85.5% moisture | Mud, 1.02 gm/cm³ | $2.2 \times 10^{-6}$ | 19°-20° C | " |
| " | Solid | Barium nitrate | $8.0 \times 10^{-20}$ | Not stated (room temperature) | Strassmann, quoted by Flugge and Zimens, 1939 |

The concentration gradient shown in FIG. 1 is approximately that which would result at a location at which there is no, or negligible, subsurface air flow. Thus, the reading for cup 10 for the radon concentration (obtained either directly, or indirectly by subtracting the value of the thoron concentration) is represented by line ab. Similarly, the radon concentration at cup 11 is represented by line cd. It is not necessary to know the value of the concentration of radon in the soil at a great depth ($c\infty$). However, it important that the medium be uniform with respect to porosity and radon emanation for a depth of at least $2d_2$.

Next, the magnitude of the radon concentration at depth $d_2$ is compared with the magnitude of the radon concentration at depth $d_1$ to obtain a figure of merit.

This is obtained by dividing the magnitude of radon concentration at the greater depth by the magnitude of concentration at the shallower depth. For a ratio of $d_2$ to $d_1$ of 3:1, if the figure of merit so produced ranges from 1.0 to about 1.7 then the situation illustrated in FIG. 2 applies; i.e., there is significant upwardly directed subsurface air flow at this location. If the figure of merit has a value ranging from about 1.7 to about 2.22 this is indicative of the situation illustrated in FIG. 1, i.e. there is little or no subsurface air flow at this location. If the figure of merit has a value ranging from about 2.22 to as much as 3.0, the downward flow situation illustrated in FIG. 3 applies.

In a simplistic sense, a comparison of FIGS. 1, 2 and 3 will show that the location of the knee of the concentration gradient curve is moved either up (k') or down (d") from the position (k) for the no-flow condition.

Although it is convenient to employ the relationship of $d_2 = 3d_1$, there is nothing critical about employing this particular relationship. A different relationship (e.g., $d_2 = 2d_1$) will provide different indicative ranges for the figures of merit and should be compared to values determined for this relationship of $d_2$ to $d_1$.

To obtain indicative ranges for a different relationship of $d_2$ to $d_1$ for the figures of merit obtained the following steps would be carried out.

1. determine the value of D for the soil at the location in question;
2. determine the value of L for the no-flow situation from the relationship $L = \sqrt{D/\lambda}$; the value of L (in cm) is then used in equation (1) above to determine c (in terms of $c\infty$) at each depth selected for $d_2$ and $d_1$ for $z = d_2$ and $z = d_1$;
3. determine the ratio of the two values of c so obtained for the no-flow condition at $d_2$ and $d_1$;
4. the lowest figure of merit at both selected depths ($d_2$ and $d_1$) in any case will be 1.0, this only being possible in case of a high rate of vertical flow and rapid escape of the radon; with the present state of the technology the expectation is that values in excess of 40% of the readings can be reasonably and reliably measured experimentally;
5. the difference between the ratio obtained in item 3 (above) and 1.0 is, therefore, reduced by 40% and subtracted from the ratio in item 3; this then represents the ratio level at which it can be expected to sense upward velocity.
6. thus, the applicable ranges for the figures of merit for the selected relationship of $d_2$ to $d_1$ will be:
   for upward flow . . . from 1.0 to about the value for the ratio in item 5
   for no-flow . . . from about the value of the ratio in item 5 to about the value of the ratio in item 3.

The above-described procedure is illustrated as it was used to determine the applicable ranges for the figures of merit in the situation in which $d_2 = 3d_1$. Thus, assuming a value of $D = 0.03$ cm$^2$/sec, in the absence of flow the calculated value for L will be ($L = \sqrt{D/\lambda}$) 120 cm. At depths $d_2 = 120$ cm and $d_1 = 40$ cm (i.e., with values of z equal, respectively, to 120 and 40) the values obtained for c from equation (1) are:

$c = 0.63\ c\infty$ (120 cm depth)    (a)

$c = 0.29\ c\infty$ (40 cm depth)    (b)

The maximum figure of merit obtained for the no-flow condition then is 0.63/0.29 = 2.22.

For the upward flow condition, the maximum value for the figure of merit will be 2.22 − 0.40(2.22 − 1.00) = 1.7.

Once locations have been found in which air flow out of the earth's surface from depth occurs, these are considered prime locations for the conduct of exploration by the use of surface-disposed detectors.

BEST MODE CONTEMPLATED

In the best mode, identical cups 10,11 utilizing dimethysiloxane-polycarbonate copolymer membranes to reduce or remove the thoron signal would be placed in holes A,B excavated at a distance $d_2$ apart with holes A and B being excavated to depths such that $d_2 = 3d_1$ and $d_1$ is equal to 40 cm. The preferred track-etch material is a polycarbonate (Makrofol-E manufactured by Bayer A.g., Leverkusen, West Germany).

As noted above, after a period of about one month, the cups 10,11 are removed from the holes A,B and the radon concentration is determined for each cup. The concentration observed for cup 11 is divided by the concentration observed for cup 10 and the requisite figure of merit obtained whereby the flow conditions (no flow, upward flow or downward flow) are determined.

What I claim as new and desire to secure by Letters Patent of the United States is:

1. A method for determining whether air flow is occurring into or out of the earth's surface at a given location comprising the steps of:
   excavating a first hole to a depth in the range of from about 20 cm to about 60 cm;
   excavating a second hole to a depth greater than about 1.5 the depth of said first hole, said second hole being at a distance from said first hole at least as great as the depth of said second hole;
   disposing in each of said holes identical means for detecting the presence of alpha particles;
   determining the concentration of alpha particles encountered at the bottom of each of said holes due to the presence of radon during some predetermined period of exposure; and
   calculating the ratio of the concentration of radon at the bottom of said second hole to the concentration of radon at the bottom of said first hole, the numerical value so determined providing an assessment of whether subsurface air flow was occurring and, if so, in which direction.

2. The method as recited in claim 1 wherein the maximum spacing between the first and second holes is equal to or less than twice the depth of said second hole.

3. The method as recited in claim 1 wherein each means for detecting the presence of alpha particles comprises a housing containing a body of alpha particle detection material.

4. The method as recited in claim 3 wherein the concentration of alpha particles detected at the bottom of each hole represents a direct reading of radon concentration for the bottom of each hole.

5. The method as recited in claim 1 wherein the concentration of alpha particles detected at the bottom of each hole includes the contribution of alpha particles from thoron decay, the concentration due to thoron decay being separately determined and the value thereof being subtracted from the concentration detected.

6. The method as recited in claim 1 wherein the first hole is 40 cm deep and the second hole is 120 cm deep.

7. The method as recited in claim 6 wherein the holes are 120 cm apart.

* * * * *